(12) United States Patent
Hsieh

(10) Patent No.: US 6,751,089 B2
(45) Date of Patent: Jun. 15, 2004

(54) KEYBOARD SECURING DEVICE OF NOTEBOOK COMPUTER

(75) Inventor: Hiu-Lan Hsieh, Taipei (TW)

(73) Assignee: Taiwan TriGem Information Co., Ltd., Taipei (TW)

( * ) Notice: Subject to any disclaimer, the term of this patent is extended or adjusted under 35 U.S.C. 154(b) by 33 days.

(21) Appl. No.: 10/251,580

(22) Filed: Sep. 20, 2002

(65) Prior Publication Data

US 2004/0057195 A1 Mar. 25, 2004

(51) Int. Cl.[7] .................................................. G06F 1/16
(52) U.S. Cl. ........................ 361/680; 361/683; 361/747; 400/495; 235/472.01
(58) Field of Search ................................. 361/680, 683, 361/724, 732, 740, 747, 759; 312/215, 222, 223.2; 400/492, 495, 496, 472.1; 235/472.01, 462.45, 462.43, 145 R; 345/168, 169, 170–172; 364/708.1; 248/917–920

(56) References Cited

U.S. PATENT DOCUMENTS

| | | | | |
|---|---|---|---|---|
| 4,621,781 A | | 11/1986 | Springer | .................... 248/118 |
| 5,587,878 A | * | 12/1996 | Tsai et al. | .................... 361/683 |
| 5,966,284 A | * | 10/1999 | Youn et al. | .................. 361/680 |
| 6,104,604 A | * | 8/2000 | Anderson et al. | ............ 361/680 |
| 6,212,066 B1 | * | 4/2001 | Fetterman | .................... 361/680 |
| 6,379,062 B1 | * | 4/2002 | Chiang | ........................ 400/495 |
| 6,648,231 B1 | * | 11/2003 | Chuang | .................. 235/472.01 |
| 2002/0048155 A1 | * | 4/2002 | Chiang et al. | .............. 361/747 |
| 2002/0085338 A1 | * | 7/2002 | Lin | ............................. 361/680 |
| 2003/0059242 A1 | * | 3/2003 | Horiuchi et al. | ............ 400/489 |

* cited by examiner

*Primary Examiner*—Michael Datskovsky

(57) ABSTRACT

A keyboard securing device secures a keyboard module to an opening defined in a top wall of a casing of a notebook computer. The securing device includes a resilient body from which first and second tabs extend. The first tab is attached to an underside of the top wall of the casing. The second tab extends through a slot defined in a side wall that defines the opening into the opening for engaging an edge of the keyboard module and thus securing the keyboard. A retainer is fixed in the casing and supports the resilient body of the securing device thereon. First and second flanges extend from the retainer. The first flange is fixed to the casing. The second flange is positioned on and supported by a bottom wall of the casing for movably and at least partially supporting the second tab thereon whereby the securing device is retained in position against a downward force for mounting the keyboard into the opening.

8 Claims, 5 Drawing Sheets

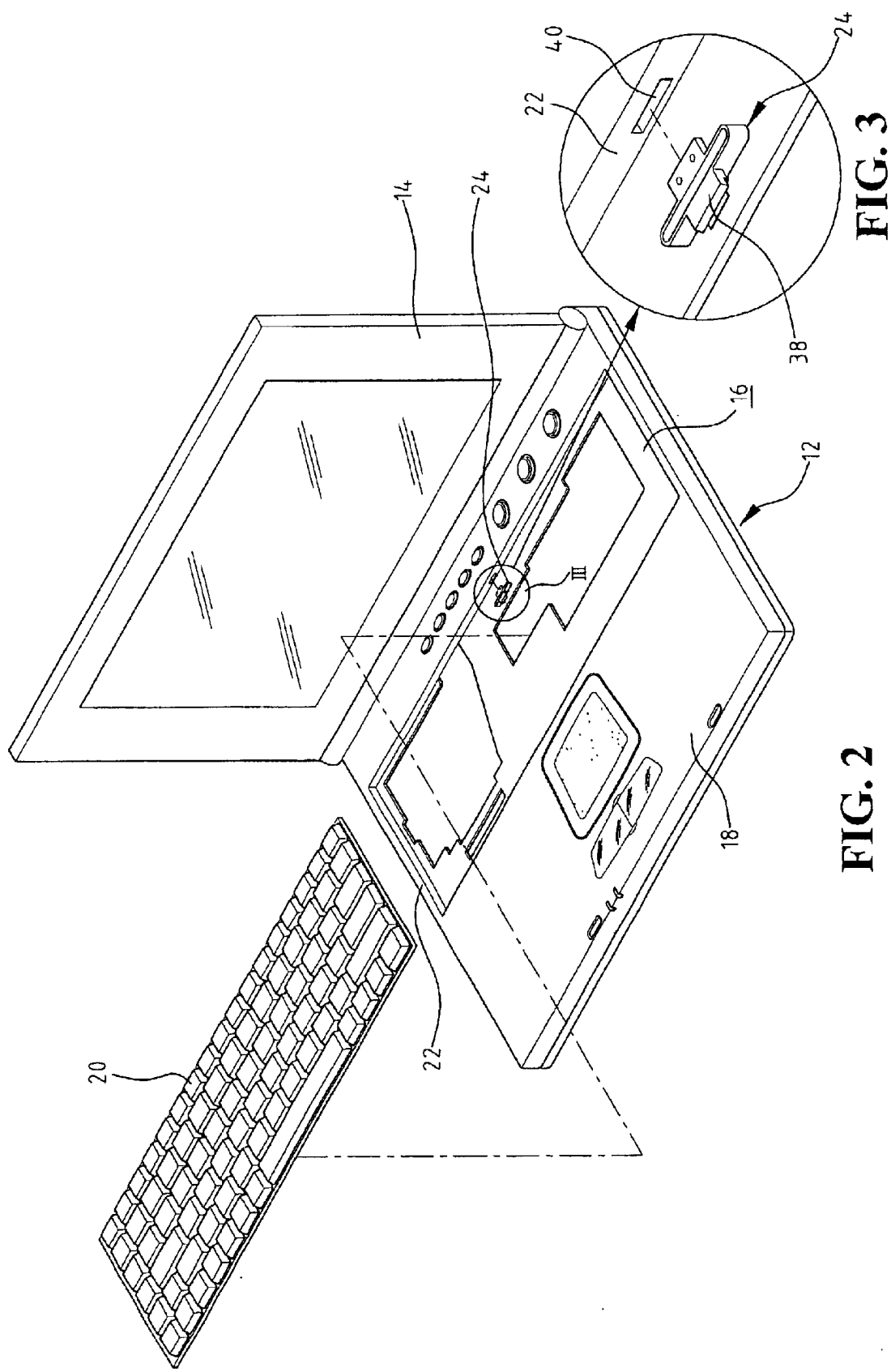

KEYBOARD SECURING DEVICE OF NOTEBOOK COMPUTER

FIELD OF THE INVENTION

The present invention relates generally to the field of notebook computer, and in particular to a device for securing a keyboard of a notebook computer.

BACKGROUND OF THE INVENTION

Notebook computers are getting prevailing and gradually replace desktop computers. The notebook computer comprises a casing inside which a number of modules are mounted and a display panel pivoted to the casing. To simplify the assembly of the notebook computer, the components are made modularized. The modules of the notebook computer are mounted to the casing with specially designed securing devices whereby the assembly process can be done efficiently. The securing devices thus play an important role in the assembly of the notebook computers and a lot of effort has been devoted to the development of the securing device for even more efficiently mounting the modules to the computer casing.

Thus, the present invention is aimed to a securing device for efficiently and effectively mounting a keyboard module to a casing of a notebook computer.

SUMMARY OF THE INVENTION

An object of the present invention is to provide a keyboard securing device of a notebook computer that allows for quick and efficient mounting of a keyboard module to a casing of the notebook computer.

Another object of the present invention is to provide a keyboard securing device that ensures stable and smooth mounting of a keyboard module of a notebook computer to a casing of the computer.

A further object of the present invention is to provide a securing device for effectively and efficiently securing a keyboard module to a casing of the notebook computer without any potential rework.

To achieve the above objects, in accordance with the present invention, there is provided a keyboard securing device for securing a keyboard module to an opening defined in a top wall of a casing of a notebook computer. The securing device comprises a resilient body from which first and second tabs extend. The first tab is attached to an underside of the top wall of the casing. The second tab extends through a slot defined in a side wall that defines the opening into the opening for engaging an edge of the keyboard module and thus securing the keyboard. A retainer is fixed in the casing and supports the resilient body of the securing device thereon. First and second flanges extend from the retainer. The first flange is fixed to the casing. The second flange is positioned on and supported by a bottom wall of the casing for movably and at least partially supporting the second tab thereon whereby the securing device is retained in position against a downward force for mounting the keyboard into the opening.

BRIEF DESCRIPTION OF THE DRAWINGS

The present invention will be apparent to those skilled in the art by reading the following description of a preferred embodiment thereof, with reference to the attached drawings, in which:

FIG. 2 is an exploded view of the notebook computer;

FIG. 3 is an enlarged view of encircled portion III of FIG. 2, particularly showing the securing device;

DETAILED DESCRIPTION OF THE INVENTION

Figure 1:
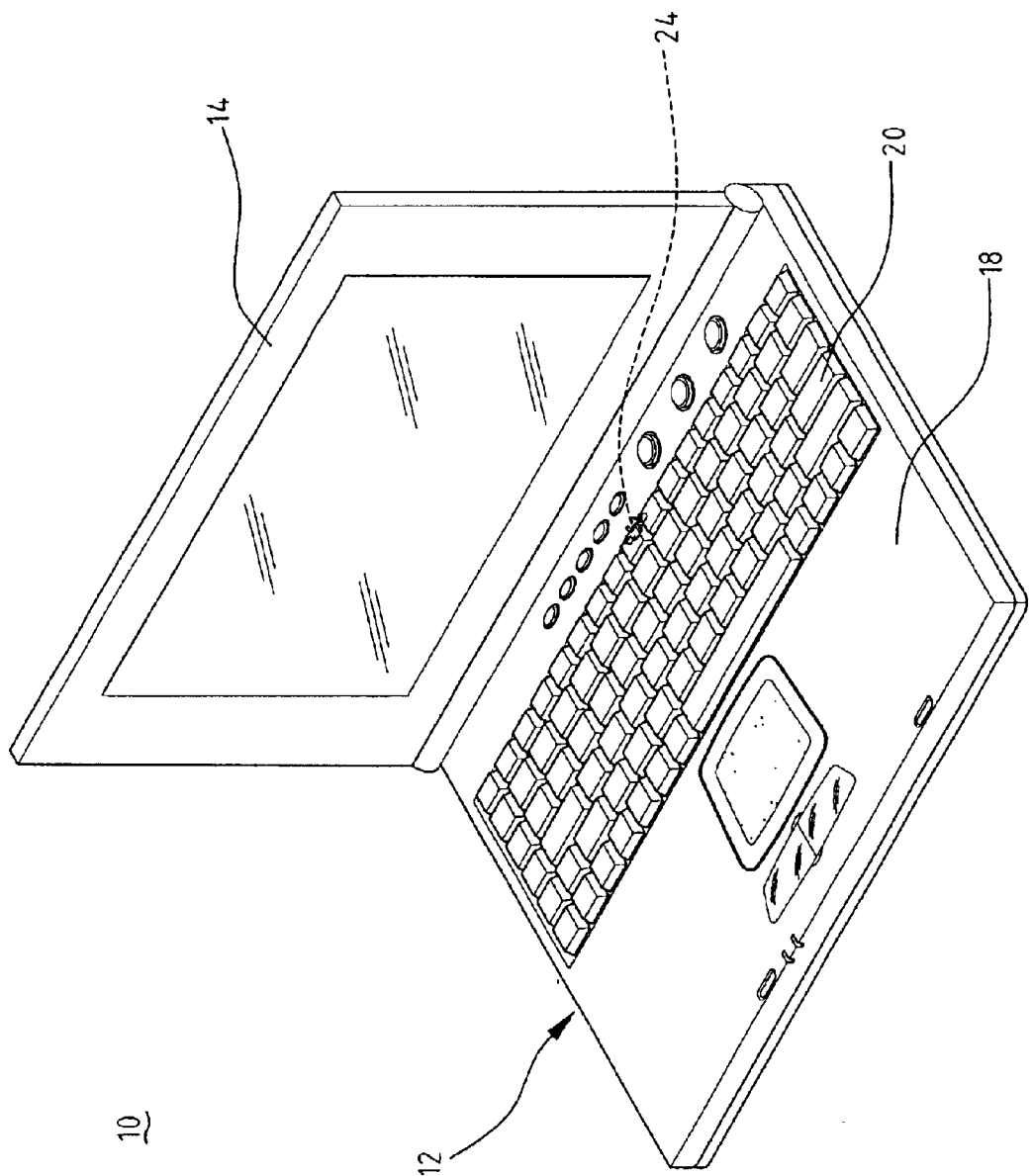
FIG. 1 is a perspective view of a notebook computer in which a securing device constructed in accordance with the present invention is incorporated to secure a keyboard module to a casing.

With reference to the drawings and in particular to FIGS. 1–3, a notebook computer, generally designated with reference numeral 10, comprises a casing 12 to which a display panel 14 is pivoted. The casing 12 forms an opening 16 in a top wall 18 thereof for accommodating a keyboard module 20. In the embodiment illustrated, the opening 16 is substantially rectangular for complying with an outside configuration of the keyboard module 20 and is defined by four side walls 22. A securing device constructed in accordance with the present invention, generally designated with reference numeral 24, is mounted in the casing 12 close to the side walls 22 and partially extending into the opening 16 through the side walls 22 for engaging and thus securing the keyboard module 20 in the opening 16 of the casing 12.

Figure 4:
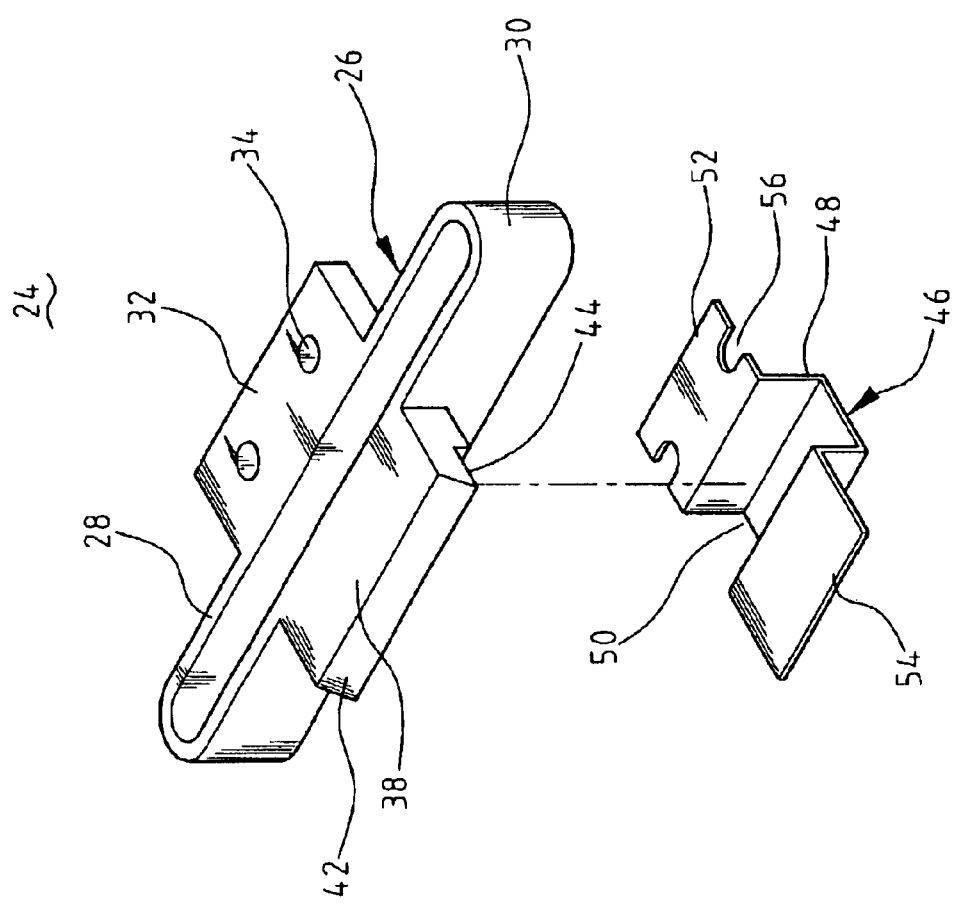
FIG. 4 is an exploded view of the securing device of the present invention.

Also referring to FIG. 4, the securing device 24 comprises a resilient portion 26 comprised of two opposite and spaced plates 28 connected together at opposite ends thereof by arcuate connections 30, allowing the plates 28 to be elastically deformed toward each other when subject to a compression force and to return to their original shapes when the compression force is removed. In this respect, the resilient portion 26 may be made of plastics. A fixing tab 32 extends from an inner one of the plates 28 and defines holes 34 for receiving fasteners 35 (FIGS. 5 and 6) that fix the securing device 24 to an underside 36 of the top wall 18 of the casing 12. A securing tab 38 extends from the other plate 28 in a direction opposite to the fixing tab 32. The securing tab 38 is allowed to partially extend through a slot 40 defined in the side wall 22 of the keyboard accommodating opening 16 of the casing 12 and projecting into the opening 16 to engage the keyboard module 20.

Figure 5:
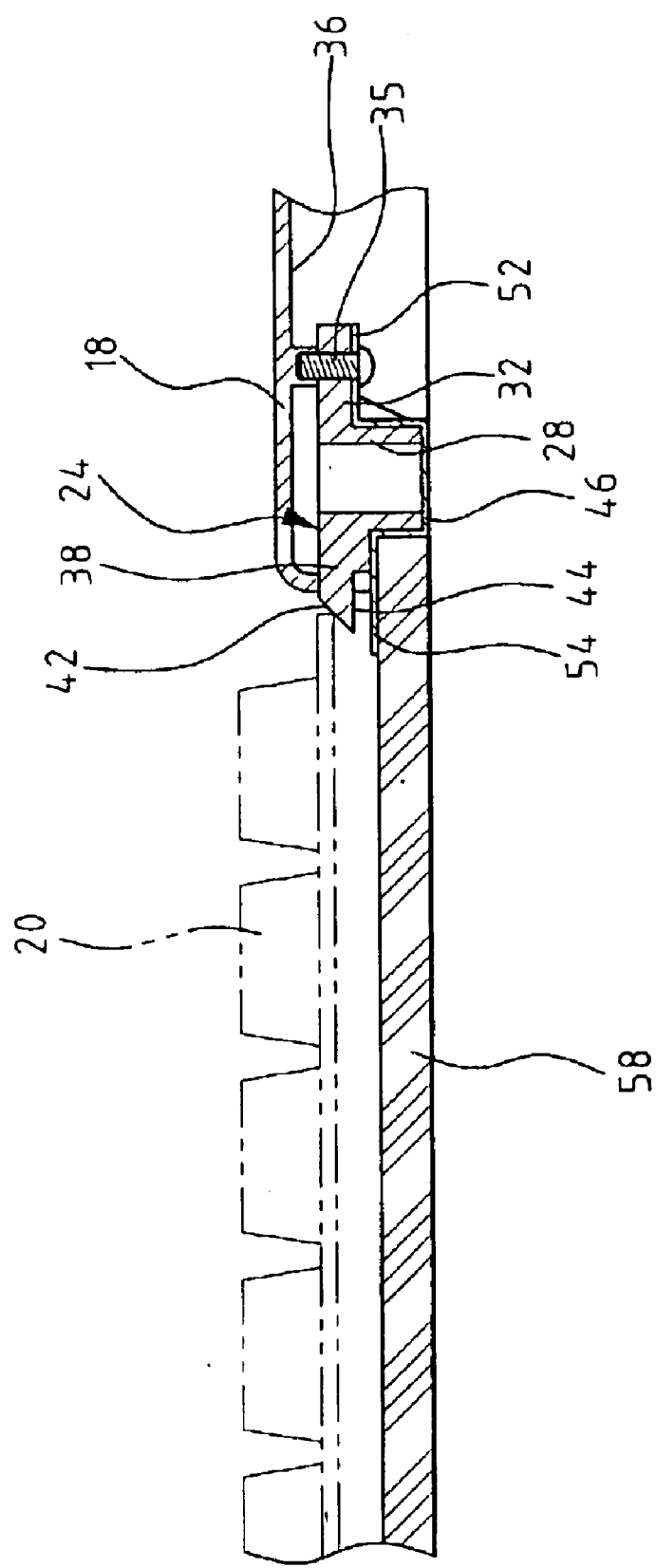
FIG. 5 is a cross-sectional view of a portion of the notebook computer showing the operation of mounting the keyboard module to the casing of the notebook computer.
Figure 6:
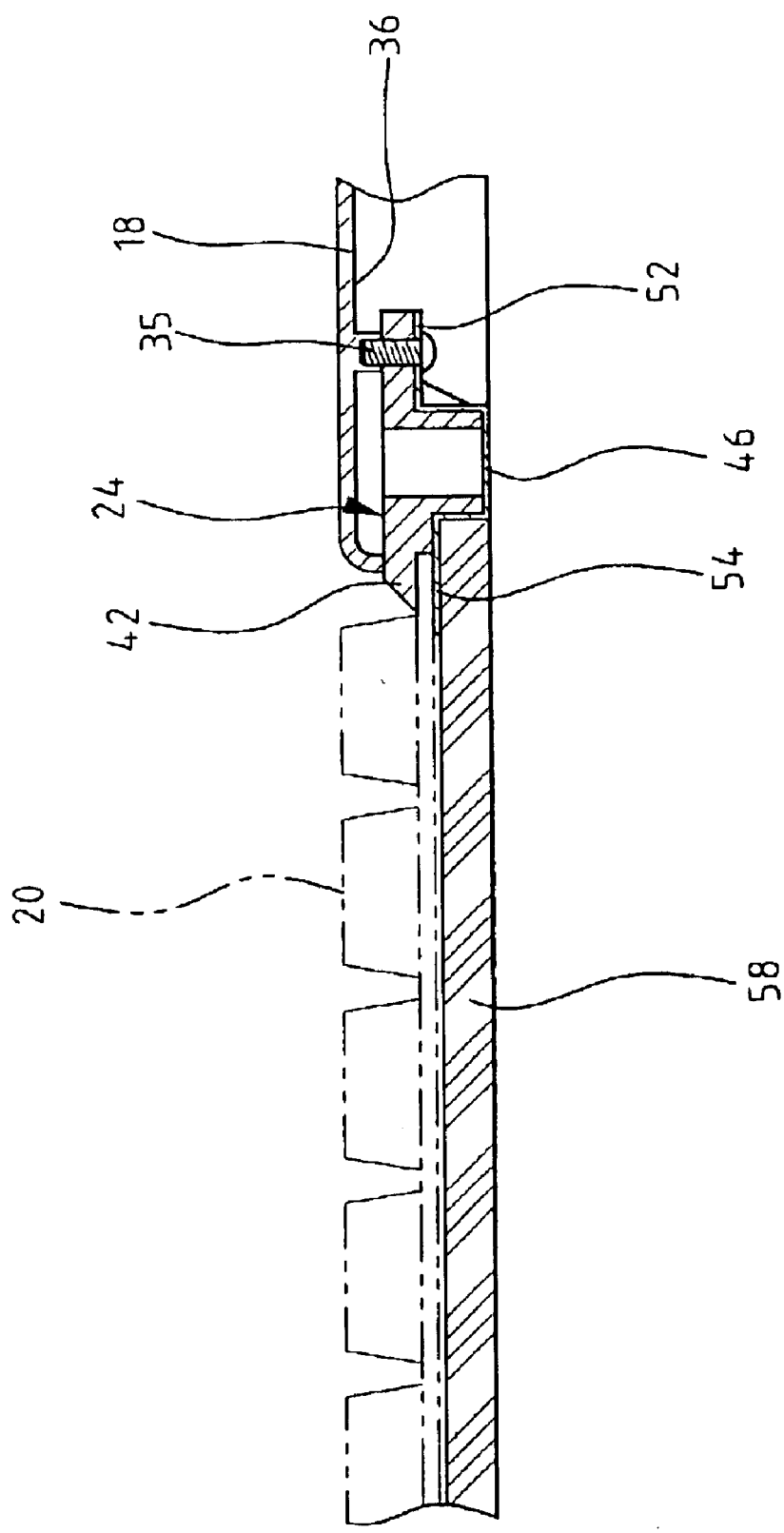
FIG. 6 is a cross-sectional view similar to FIG. 5 but showing the keyboard module secured in the casing by the securing device of the present invention.

Also referring to FIGS. 5 and 6, the securing device 24 is attached to the underside 36 of the top wall 18 of the casing 12 by fasteners 35 with the securing tab 38 extending into the opening 16 to engage the keyboard module 20. The fasteners 35 can be any suitable fasteners, such as molded rivets integrally formed with the casing 12 or bolts. The securing tab 38 that extends into the opening 16 forms an inclined camming face 42. To mount the keyboard module 20 to the opening 16, the keyboard module 20 is initially positioned in the opening 16 with an edge (not labeled) thereof temporarily supported by the camming face 42 (FIG. 5). A downward force is then applied to the keyboard module 20, pushing the keyboard module 20 downward into the opening 16. The camming face 20 translates the downward force into a compression force to the resilient portion 26, deforming the plates 28 to retract the securing tab 38 into the slot 40 of the side wall 22. Thus, the keyboard module 20 is allowed to completely enter the opening 16. The resiliency of the resilient portion 26 biases the securing tab 38 back into the opening 16 to have a lower side 44 of the securing tab 38 engaging the edge of the keyboard module 20 thereby securing the keyboard module 20 in the opening 16 as shown in FIG. 6.

A retainer 46, serving to support and retain the securing device 24 in position inside the casing 12, comprises a U-shaped body 48 defining a space 50 for accommodating the resilient portion 26 of the securing device 24 therein. First and second flanges 52, 54 extend from opposite sides of the U-shaped body 48 in opposite directions. The first flange 52 overlaps an underside of the fixing tab 32 and defines cutoffs 56 for accommodating the fasteners 35 to have the retainer 46 secured to the casing 12 with the securing device 24. The second flange 54 is positioned on and supported by a portion 58 of the casing 12 and partially supports the securing tab 38 thereon. The second flange 54 functions to support, in a movable manner, the securing tab 38 of the securing device 24 against the downward force of mounting the keyboard module 20 to the opening 16 of the casing 12 and ensures that the securing tab 38 is properly retained in the slot 40 of the side wall 22 of the opening 16.

Preferably, the retainer 46 is made of metal plate and has smooth surface for allowing for movement of the securing tab 38 on the second flange 54.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A device for securing a keyboard module to an opening defined in a top wall of a casing of a notebook computer comprising:

a resilient body from which first and second tabs extend, the first tab being attached to the casing and the second tab extending through a side wall that defines the opening into the opening for engaging an edge of the keyboard module; and a retainer supporting the resilient body thereon, first and second flanges extending from the retainer, the first flange being fixed to the casing, the second flange being positioned on and supported by a portion of the casing for movably and at least partially supporting the second tab thereon.

2. The device as claimed in claim 1, wherein the resilient body comprises two opposite and spaced plates having opposite ends connected by connection portions, the plates being elastically deformable toward each other when subject to a compression force.

3. The device as claimed in claim 1, wherein the first tab defines holes for accommodating fasteners that attach the device to the casing of the notebook computer.

4. The device as claimed in claim 3, wherein fasteners comprise molded rivets integrally formed with the casing.

5. The device as claimed in claim 1, wherein the second tab comprises an inclined camming face which when engaged by the edge of the keyboard module with a downward force converts the downward force into a compression force for deforming the resilient body to retract the second tab so as to allow the keyboard module to completely enter the opening.

6. The device as claimed in claim 1, wherein a slot is defined in the side wall, the second tab extending through the slot into the opening to engage the keyboard module.

7. The device as claimed in claim 1, wherein the resilient body is made of plastics.

8. The device as claimed in claim 1, wherein the retainer is made of metal plate.

* * * * *